United States Patent
Dubal et al.

(10) Patent No.: US 9,846,576 B2
(45) Date of Patent: Dec. 19, 2017

(54) TECHNOLOGIES FOR REPROGRAMMING NETWORK INTERFACE CARDS OVER A NETWORK

(71) Applicant: Intel Corporation, Santa Clara, CA (US)

(72) Inventors: Scott P. Dubal, Beaverton, OR (US); Patrick Connor, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/583,665

(22) Filed: Dec. 27, 2014

(65) Prior Publication Data
US 2016/0188313 A1    Jun. 30, 2016

(51) Int. Cl.
*G06F 9/44*    (2006.01)
*G06F 9/445*   (2006.01)

(52) U.S. Cl.
CPC ............... *G06F 8/65* (2013.01); *G06F 8/665* (2013.01)

(58) Field of Classification Search
CPC .............................................. G06F 8/60–8/76
USPC ................................................ 717/168–178
See application file for complete search history.

(56) References Cited

U.S. PATENT DOCUMENTS

| | | | | |
|---|---|---|---|---|
| 6,009,274 A * | 12/1999 | Fletcher | ............... | G06F 8/65 709/217 |
| 6,363,423 B1 * | 3/2002 | Chiles | ............... | H04L 29/12009 709/224 |
| 6,487,608 B2 * | 11/2002 | Gifford, Jr. | ............... | G06F 9/4411 710/10 |
| 6,715,067 B1 * | 3/2004 | Rhoads | ............... | G06F 3/0607 711/206 |
| 6,775,693 B1 * | 8/2004 | Adams | ............... | G06F 13/28 709/213 |
| 6,865,637 B1 * | 3/2005 | Linares | ............... | H04L 12/66 700/20 |
| 6,948,099 B1 * | 9/2005 | Tallam | ............... | G06F 11/1417 714/3 |

(Continued)

OTHER PUBLICATIONS

Run-time Updating of Network Device Drivers—Hiroyuki Tanaka, Yoshinari Nomura, and Hideo Taniguchi—Graduate School of Natural Science and Technology Okayama University Okayama, Japan—2009 International Conference on Network-Based Information Systems.*

(Continued)

*Primary Examiner* — Francisco Aponte
(74) *Attorney, Agent, or Firm* — Barnes & Thornburg LLP

(57) ABSTRACT

Technologies for reprogramming/updating non-volatile memory (NVM) for a peripheral, such as a network interface controller (NIC). Communications are provided in the NIC for communicating data to and from a network from a computer node, along with a controller operatively coupled to the communications for controlling the communication of data. A NIC access redirection agent module is configured to accesses a NVM firmware image from the network via the communications to reprogram and/or update the NIC, wherein the accessed NVM firmware image is utilized by the computer node NIC for operation. A network node may include a firmware manager for selecting one of a plurality of NVM firmware images and provide access to the selected NVM firmware image for the computer node to update computer node firmware for the computing device over the computer network.

12 Claims, 5 Drawing Sheets

(56) References Cited

U.S. PATENT DOCUMENTS

| | | | | |
|---|---|---|---|---|
| 7,171,551 B1* | 1/2007 | Gavlik | G06F 11/1433 | 709/221 |
| 7,197,588 B2* | 3/2007 | Tsao | G06F 9/4812 | 710/267 |
| 7,222,339 B2* | 5/2007 | Rothman | G06F 8/65 | 717/168 |
| 7,519,069 B2* | 4/2009 | Wang | H04L 29/12301 | 370/395.52 |
| 7,627,684 B2* | 12/2009 | Boucher | H04L 12/5693 | 709/217 |
| 7,631,107 B2* | 12/2009 | Pandya | H04L 29/06 | 370/389 |
| 7,685,254 B2* | 3/2010 | Pandya | G06F 17/30985 | 370/389 |
| 7,702,739 B1* | 4/2010 | Cheng | H04L 47/10 | 709/203 |
| 7,783,788 B1* | 8/2010 | Quinn | G06F 9/5077 | 710/10 |
| 7,783,880 B2* | 8/2010 | Pinkerton | H04L 63/0485 | 370/469 |
| 7,917,689 B2* | 3/2011 | Rothman | G06F 12/0246 | 711/103 |
| 7,992,018 B2* | 8/2011 | Kawaji | G06F 1/3209 | 709/250 |
| 8,127,021 B2* | 2/2012 | Lankford | H04L 45/00 | 709/203 |
| 8,214,653 B1* | 7/2012 | Marr | G06F 21/572 | 380/286 |
| 8,285,881 B2* | 10/2012 | Elzur | H04L 47/10 | 709/250 |
| 8,341,286 B1* | 12/2012 | Craft | H04L 69/161 | 370/229 |
| 8,462,632 B1* | 6/2013 | Vincent | H04L 47/30 | 370/235 |
| 8,489,761 B2* | 7/2013 | Pope | H04L 69/16 | 709/236 |
| 8,607,219 B2* | 12/2013 | Minegishi | G06F 8/65 | 717/168 |
| 8,706,687 B2* | 4/2014 | Fineberg | G06F 17/30368 | 707/609 |
| 8,839,267 B2* | 9/2014 | Lopez Taboada | G06F 9/544 | 719/313 |
| 8,887,144 B1* | 11/2014 | Marr | G06F 8/65 | 713/2 |
| 8,971,538 B1* | 3/2015 | Marr | H04L 63/145 | 380/285 |
| 9,152,432 B2* | 10/2015 | Cabot | G06F 9/4416 | |
| 9,208,047 B2* | 12/2015 | McGraw | G06F 11/3006 | |
| 9,244,695 B2* | 1/2016 | Zhang | G06F 9/4411 | |
| 2004/0031029 A1* | 2/2004 | Lee | G06F 8/65 | 717/171 |
| 2005/0256976 A1* | 11/2005 | Susairaj | G06F 12/1081 | 710/3 |
| 2007/0050426 A1* | 3/2007 | Dubal | G06F 8/65 | |
| 2007/0233886 A1* | 10/2007 | Fan | H04L 69/16 | 709/230 |
| 2008/0140932 A1* | 6/2008 | Flynn | G06F 1/183 | 711/114 |
| 2009/0235242 A1* | 9/2009 | Kawaguchi | H04N 1/00002 | 717/168 |
| 2010/0070650 A1* | 3/2010 | MacGaffey | H04L 69/161 | 709/238 |
| 2014/0040449 A1* | 2/2014 | Kinoshita | G06F 11/3006 | 709/223 |
| 2014/0059537 A1* | 2/2014 | Kamble | G06F 9/45558 | 718/1 |
| 2015/0032835 A1* | 1/2015 | Sharp | G06F 15/167 | 709/212 |
| 2015/0254191 A1* | 9/2015 | Sukonik | G06F 13/1673 | 711/106 |
| 2015/0254196 A1* | 9/2015 | Sukonik | H04L 45/30 | 709/212 |
| 2015/0281126 A1* | 10/2015 | Regula | G06F 13/4022 | 709/212 |

OTHER PUBLICATIONS

Design of an efficient Software Environment for a RDMA Network Interface Controller—Diploma Thesis by Sven Stork; presented to Computer Architecture Group, Department of Computer Engineering, University of Mannheim—Jan. 11, 2006.*

* cited by examiner

TECHNOLOGIES FOR REPROGRAMMING NETWORK INTERFACE CARDS OVER A NETWORK

BACKGROUND

Modern computing devices have become ubiquitous tools for personal, business, and social uses. As such, many modern computing devices are capable of connecting to various data networks, including the Internet and corporate intranets, to retrieve and receive data communications over such networks. Oftentimes, a computing device connected to one network needs to communicate with a computing device connected on a different network.

A network interface controller (NIC) (also known as a network interface card, network adapter, LAN adapter, and by similar terms) is a computer hardware component or peripheral that connects a computer to a computer network. A NIC implements the electronic circuitry required to communicate using a specific physical layer and data link layer standard such as Ethernet, Wi-Fi or Token Ring. This provides a base for a full network protocol stack, allowing communication among small groups of computers on the same LAN and large-scale network communications through routable protocols, such as IP.

NICs typically rely on firmware running on silicon, such as non-volatile memory (NVM) or other solid state devices (SSDs) to perform important features of the media access control (MAC) layer and physical (PHY) layer of the OSI model. If a NIC is shipped with a firmware defect, it is often difficult for a customer to update the firmware in the NVM using standard methods. Firmware defects may be compounded exponentially in applications involving data centers and/or cloud servers, where hundreds and even thousands of devices may be affected. In the case of firmware updates, current techniques for updating firmware are largely limited to updating each NIC one at a time using software run locally on a server. Even when firmware updating is scripted, NVM version management and deployment can be very complex.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
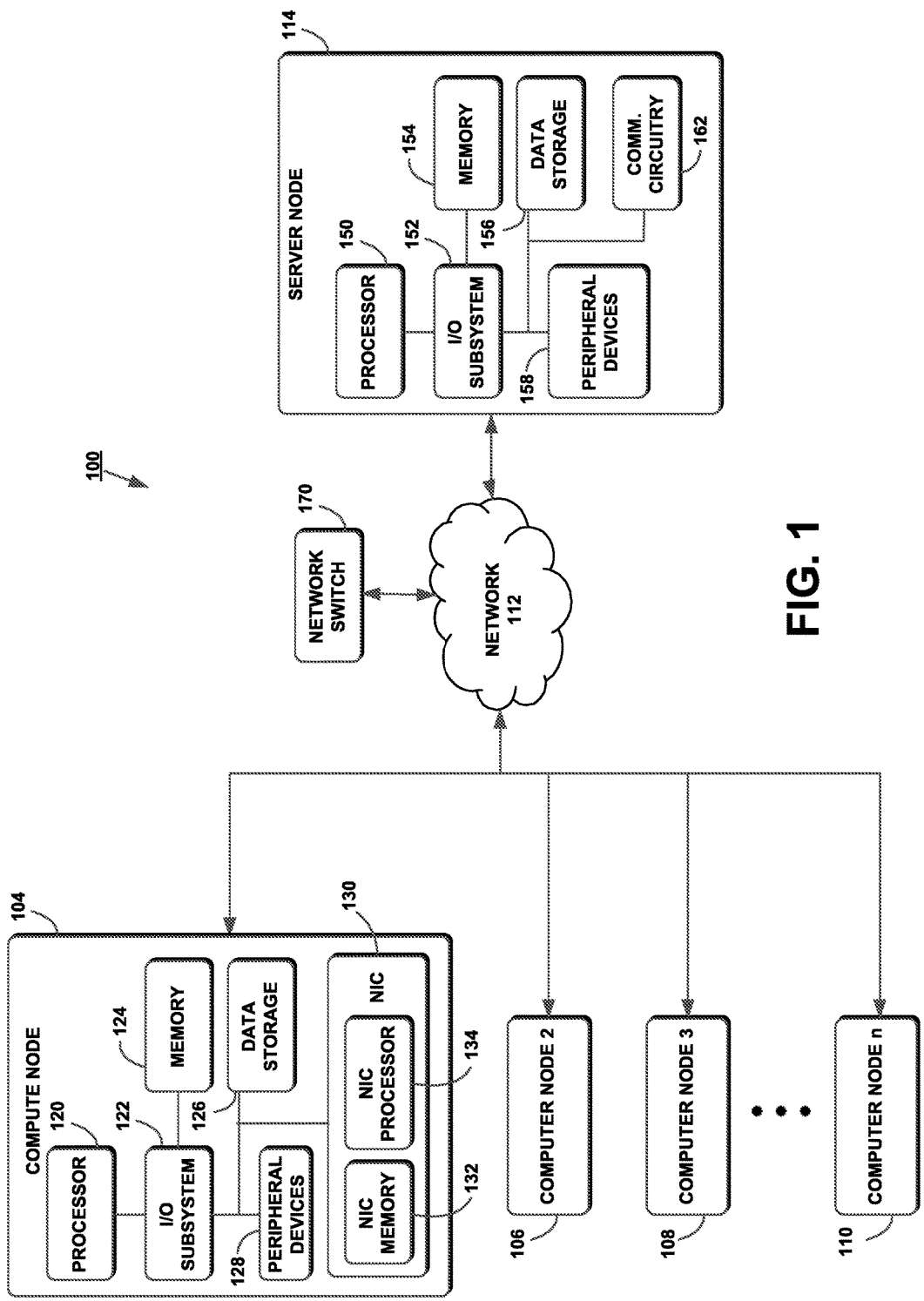
FIG. 1 is a simplified block diagram of at least one illustrative embodiment of a system for updating firmware of a NIC of a plurality of computer nodes on a network.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any tangibly-embodied combination thereof. The disclosed embodiments may also be implemented as instructions carried by or stored on one or more non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, an illustrative embodiment of system 100 for updating firmware of network interface controllers (NICs) of computer nodes includes a server node 114 communicatively coupled to a plurality of computer nodes (104-110) via a network 112. In use, the server node 114 is configured to provide and/or update the firmware of a NIC of each computer node 104-110. To do so, each NIC of each computer node 104-110 is directed to load firmware stored on the server node 114 rather than loading firmware directly from local memory. In this way, firmware updates may be managed by the server node 114 and located at a single point of reference.

In the embodiment illustrated in FIG. 1, the computer node 104 (as well as computer nodes 106-110) may be embodied as any type of computing device capable of performing the functions described herein. For example, a computer node may be embodied as, but is not limited to, a computer, a desktop computer, a personal computer (PC), a tablet computer, a laptop computer, a notebook computer, a mobile computing device, a smart phone, a cellular telephone, a handset, a messaging device, a work station, a network appliance, a web appliance, a distributed computing system, a multiprocessor system, a processor-based system, a consumer electronic device, a digital television device, a set top box, and/or any other computing device configured to store and access data, and to execute electronic cloud software and related applications. The computer nodes 2-n (106-110) may be similarly configured to the arrangement illustrated in computer node 104.

In the illustrative embodiment of FIG. 1, each computer node 104 includes processor 120, I/O subsystem 122, memory 124, data storage 126, communication circuitry 132, and one or more peripheral devices 128. Of course, computer node 104 may include other or additional components, such as those commonly found in a digital apparatus and/or computer (e.g., various input/output devices), in other embodiments. Additionally, in some embodiments, one or more of the illustrative components may be incorporated in, or otherwise form a portion of, another component. For example, the memory 124, or portions thereof, may be incorporated in the processor 120 in some embodiments.

The processor 120 may be embodied as any type of processor currently known or developed in the future and capable of performing the functions described herein. For example, the processor 120 may be embodied as a single or multi-core processor(s), digital signal processor, microcontroller, and/or other processor or processing/controlling circuit. Similarly, the memory 124 may be embodied as any type of volatile or non-volatile memory or data storage currently known or developed in the future and capable of performing the functions described herein. In operation, the memory 124 may store various data and software used during operation of the computer node 104 such as operating systems, applications, programs, libraries, and drivers.

The memory 124 may be communicatively coupled to the processor 120 via an I/O subsystem 122, which may be embodied as circuitry and/or components to facilitate input/output operations with the processor 120, memory 124, and other components of the computer node 104. For example, the I/O subsystem 122 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 122 may form a portion of a system-on-a-chip (SoC) and be incorporated, along with processor 120, memory 124, and other components of computer node 104, on a single integrated circuit chip.

Communication circuitry of the computer node 104 may include NIC 130 and any number of other devices and circuitry for enabling communications between computer node 104 and one or more other external electronic devices and/or systems. In the illustrative embodiment of FIG. 1, the NIC 130 may include a NIC memory 132 and a NIC processor 134 for storing, updating and/or executing firmware and related operational instructions. However, in illustrative embodiments discussed in greater detail below, the NIC 130 may access operational firmware instructions from server node 114 after boot up. Under such a configuration, NIC memory 132 is not required. In an alternate embodiment, NIC memory 132 may be configured as a volatile memory (e.g., random access memory) for temporarily storing data and/or firmware update instructions. NIC 130 may be embodied as a standalone chip, part of a chipset integrated with another computer node component (e.g., motherboard), or a removable card or device. Peripheral devices 128 may include any number of additional input/output devices, interface devices, and/or other peripheral devices including a display, along with associated graphics circuitry and, in some embodiments, may further include a keyboard, a mouse, audio processing circuitry (including, e.g., amplification circuitry and one or more speakers), and/or other input/output devices, interface devices, and/or peripheral devices.

In some embodiments, the memory 124 and/or data storage 126 has stored therein one or more application programs, and the processor 120 is operable to execute the one or more application programs and control a display screen to display corresponding graphical information thereon. In some embodiments, the system 100 may include a server node 114 configured to store and/or execute the one or more application programs, and in such embodiments the computer node 104 may operate as a thin-client device. Although only one such server node 114 is shown in FIG. 1, it should be appreciated that, in other embodiments, the system 100 may include any number of server nodes.

The server node 114 may be embodied as any type of server (e.g., a web server, SDN server, etc.) or similar computing device capable of performing the functions described herein. In the illustrative embodiment of FIG. 1, the server node 114 includes a processor 150, an I/O subsystem 152, a memory 154, a data storage 156, communication circuitry 162, and one or more peripheral devices 158. Components of server node 114 may be similar to the corresponding components of the computer node 104, the description of which is applicable to the corresponding components of server node 114 and is not repeated herein for clarity of the description.

The communication circuitry 162 of the server node 114 may include any number of devices and circuitry for enabling communications between the server node 114 and the computer nodes 104-110. In some embodiments, the server node 114 may also include one or more peripheral devices 158. Such peripheral devices 158 may include any number of additional input/output devices, interface devices, and/or other peripheral devices commonly associated with a server or computing device.

In the illustrated embodiment, communication between the computer nodes 104-110 and the server node 114 takes place via the network 112 that may be operatively coupled to one or more network switches 170. In one embodiment, the network 112 may represent a wired and/or wireless network and may be or include, for example, a local area network (LAN), personal area network (PAN), storage area network (SAN), backbone network, global area network (GAN), wide area network (WAN), or collection of any such computer networks such as an intranet, extranet or the Internet (i.e., a global system of interconnected network upon which various applications or service run including, for example, the World Wide Web). Generally, the communication circuitry 132 of the computer node 104 and the communication circuitry 162 of server node 114 may be configured to use any one or more, or combination, of communication protocols to communicate with each other such as, for example, a wired network communication protocol (e.g., TCP/IP), a wireless network communication protocol (e.g., Wi-Fi®, WiMAX), a cellular communication protocol (e.g., Wideband Code Division Multiple Access (W-CDMA)), and/or other communication protocols. As such, the network 112 may include any number of additional devices, such as additional computers, routers, and switches, to facilitate communications between the computer node 104 and the server node 114.

Under various embodiments described in further detail below, the server node 114 may be configured to provide access to operational firmware and/or firmware updates to NIC 130 in any of computer nodes 104-110 utilizing NVM over Ethernet (NVMoE), which is also referred to in the art as "NVM Express over Fabrics" and/or "NVM Express over Fiber." The technology disclosed herein may be based on NVM Express (NVMe), or Non-Volatile Memory Host Controller Interface Specification (NVMHCI), which is a specification directed to accessing solid-state drives (SSDs) attached through a PCI Express (PCIe) bus. "NVM" stands as an acronym for non-volatile memory, which is used in SSDs. As a logical device interface, NVM Express advantageously capitalizes on the low latency and parallelism of PCI Express SSDs, and fulfills the parallelism of contemporary CPUs, platforms and applications. By allowing parallelism levels offered by SSDs to be fully utilized by host's hardware and software, NVM Express brings various performance improvements.

NVMoE as disclosed herein extends the benefits of NVMe to larger networks, beyond the reach and scalability of PCIe. NVMoE enables deployments with hundreds or thousands of NICs and/or SSDs using a network interconnect, such as Remote Direct Memory Access (RDMA) over Ethernet. Using an optimized NVMoE protocol stack, end-to-end communications may experience reduced access latency and improved performance, particularly when paired with a low latency, high efficiency transport such as RDMA. RDMA allows the computers nodes 104-110 in the network 112 to exchange data in main memory without involving the processor, cache, or operating system of either computer.

Similar to locally-based Direct Memory Access (DMA), RDMA improves throughput and performance because it frees up resources. RDMA also facilitates a faster data transfer rate. In certain embodiments, the RDMA implements a transport protocol in the NIC hardware and supports zero-copy networking features. Zero-copy networking makes it possible to read data directly from the main memory of one computer or component (e.g., memory 154 of server node 114) and write or access that data directly to the other computer or component (e.g., firmware manager module 302). As discussed in greater detail below, NIC 130 may be configured to load a NVM image over a standard Ethernet port via NVMoE. This would advantageously allow data centers, cloud providers and the like to update and load a most current firmware on entire racks of NICs substantially at the same time (subject to network traffic, congestion, latency and hardware speeds and throughputs).

Figure 2:
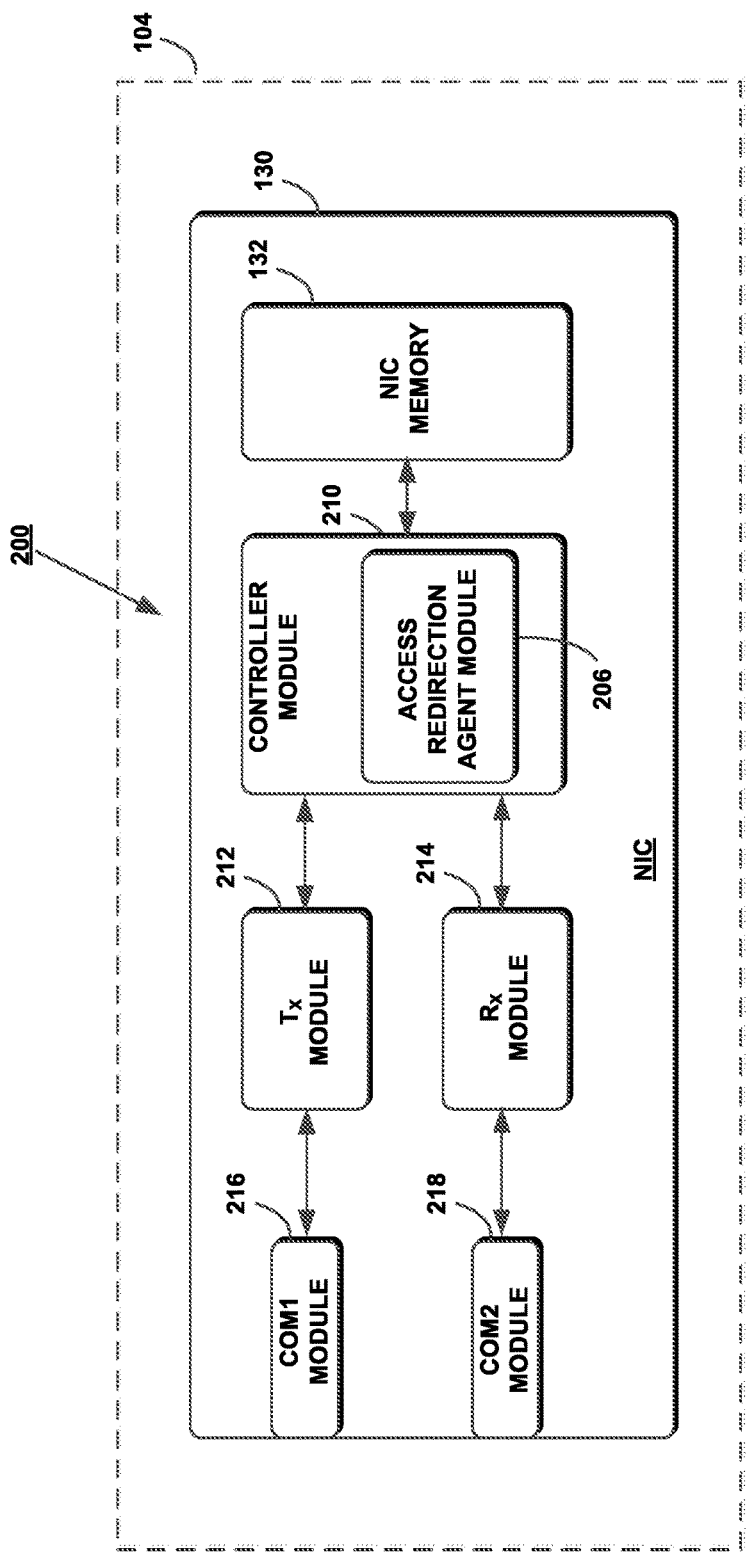
FIG. 2 is a simplified block diagram of at least one illustrative embodiment of an environment of a NIC of a computer node of the system FIG. 1.

Referring now to FIG. 2, in use, the NIC 130 of each computing node 104-110 establishes an environment 200. In the illustrative embodiment, the environment 200 includes a controller module 210, which accesses and executes firmware accessed from server node 114 via access redirection agent module 206. The environment 200 also includes a first communication interface module 216 and second communication module 218, which are respectively coupled to a transmit ($T_x$) module 212 and a receive ($R_x$) module 214 as shown. The first communication interface 216 and the second communication interface 218 enable communications between the NIC 130 of computer node 104 and one or more other external electronic devices and/or system. The first communication interface 216 and second communication interface 218 may be embodied as any type of communication interface such as an optical or a copper-based interface. In certain embodiments, a single communication interface may be used to communicate data to and from the transmit nodule 212 and receive module 214.

The transmit module 212 and receive module 214 are coupled to the controller module 210, which may be configured to process and control the data interface and connection to and from the communication interfaces 216, 218. The controller module 210 may be configured to communicate data using any of a number of protocols including serial PHY or XAUI, which provides a full duplex interface that uses four (4) self-clocked serial differential links in each direction to achieve 10 Gb/s data throughput. Each serial link operates at 3.125 Gb/s to accommodate both data and the overhead associated with 8B/10B coding. The self-clocked nature eliminates skew concerns between clock and data, and extends the functional reach of the XGMII (located between the MAC and the PHY) by approximately another 50 cm. The controller module 210 may be coupled to memory 132 to access firmware, wherein memory 132 may comprise a combination of persistent memory and program code and data stored in it. In one embodiment, memory 132 is embodied in a non-volatile memory device such as ROM, EPROM, or flash memory. However, as already noted herein, using direct NVMoE firmware access, discussed in further detail below, use of the non-volatile memory for firmware purposes is not needed.

In certain embodiments, access to a firmware image may be accomplished through an access redirection agent module 206 that is responsible for redirecting all NVM register accesses to the server node 114, which may be configured to act as a master NVM server. The access redirection agent module 206 may be configured as a firmware routine that is executed by the NIC 130. In certain embodiments, the access redirection agent module 206 may be configured as an applet that runs in the background in a computer node operating system (OS). When active, the access redirection agent module 206 configures NIC NVM access such that, instead of performing a local NVM read or write via Inter-Integrated Circuit (I2C), Serial Peripheral Interface (SPI) or Management Data Input/Output (MDIO), the NVM access occurs over the network 112 via the server node 114 acting as a master NVM server. In certain embodiments, the access redirection agent module 206 allows the environment of FIG. 2 to behave similar to a Preboot Execution Environment (PXE) network boot by enabling NIC 130 to become a firmware "boot" for loading the latest NVM firmware image for NIC 130. The access redirection agent module 206 may also be integrated in a computer node's BIOS to allow automatic and/or manual updating of firmware.

Figure 3:
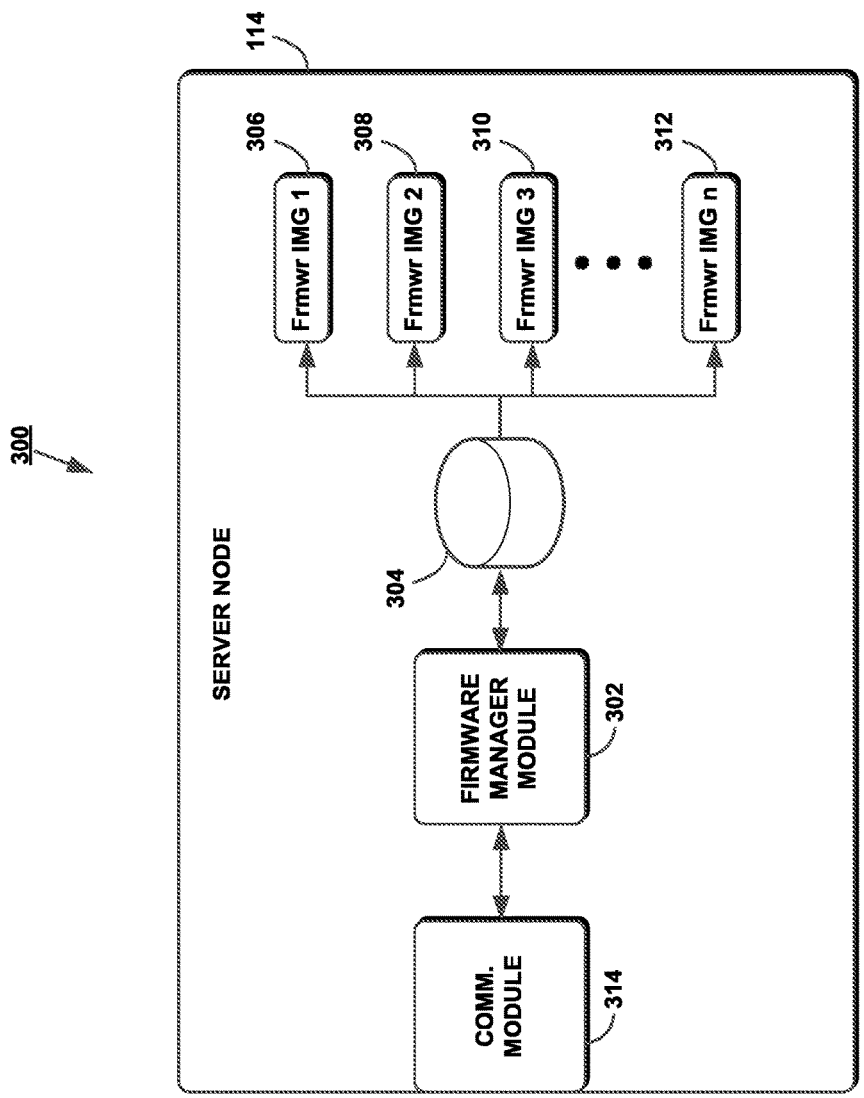
FIG. 3 is a simplified block diagram of at least one illustrative embodiment of an environment of a server node of the system of FIG. 1.

Referring now to FIG. 3, in use, the sever node 114 may establish an environment 300. The illustrative environment 300 includes a firmware manager module 302, a database 304, and a communication module 306. The various modules of the environment 300 may be embodied as hardware, firmware, software, or a combination thereof. For example the various modules, logic, and other components of the environment 300 may form a portion of, or otherwise be established by, the processor 150 or other hardware components of the server node 114. For example, in some embodiments, one or more of the modules of the environment 300 may be embodied as a circuit (e.g., a controller module circuit, a transmit ($T_x$) module circuit, a receive ($R_x$) module circuit, etc.).

In use, the communication module 314 is configured to communicate with computer nodes 104-110, and may also communicate with other remote servers and/or databases. The communication module 314 is coupled to a firmware management module 302 which is configured to access, receive, manage and/or process firmware images (306-312) and related data received via the communication module 314 and/or stored in the database 304. The firmware management module 302 may be equipped with its own memory to store and provide access to current firmware images retrieved from database 304. In certain embodiments, database 304 stores at least one, but preferably a plurality of firmware images 306-312 for reading/writing to NICs associated with each suitable computer node. The multiple firmware images 306-312 may be arranged as part of a relational database allowing the firmware manager module 302 to organize and manage firmware images according to version number, hardware compatibility, release date, and so forth. The firmware manager module 302 may utilize the relational data to select and authorize firmware image writes to NICs.

Figure 4:
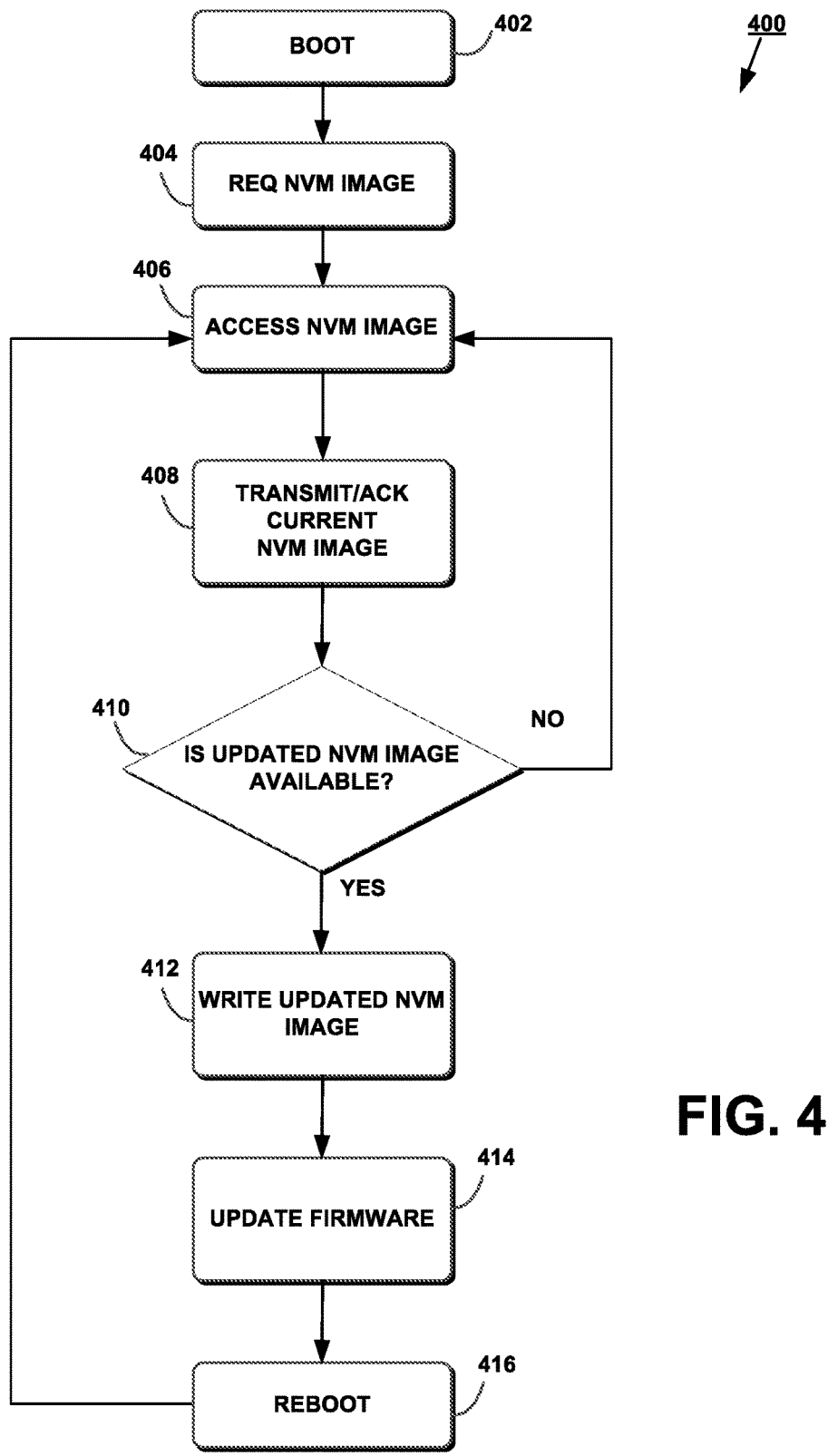
FIG. 4 is a simplified flow diagram of at least one embodiment of a method for updating firmware of a NIC of a computer node of the system of FIG. 1, which may be executed by the computer node of FIGS. 1 and 2.

Referring now to FIG. 4, in use, the NIC 130 of each computer node 104-110 may execute a method 400 for accessing and/or updating a NVM firmware image by server node 114. After the NIC 130 boots in block 402, the controller module 210 of the NIC 130 requests to read a NVM image (306-307) from the firmware manager module 302 of the server node 114 in block 404. Once the firmware manager module 302 authorizes the request, the NIC 130 accesses the requested NVM image in block 406. Periodically, or by request of the firmware management module 302, the controller module 210 transmits or acknowledges the current NVM image being accessed by the NIC 130 in block 408. The firmware management module 302 then determines in block 410 if an updated NVM image is available in database 304 in block 410. If an updated NVM image is not available ("NO"), the NIC 130 continues to access the NVM image in block 406. If, in block 410, the firmware management module 302 determines that an updated NVM image is available ("YES"), firmware management module 302 writes the updated NVM image in block 412 so that the updated NVM image may be accessed by NIC 130, resulting in updated firmware in block 414. Depending on the nature of the update, the NIC 130 may reboot in block 416 and revert back to block 406 to access the updated NVM image.

Figure 5:
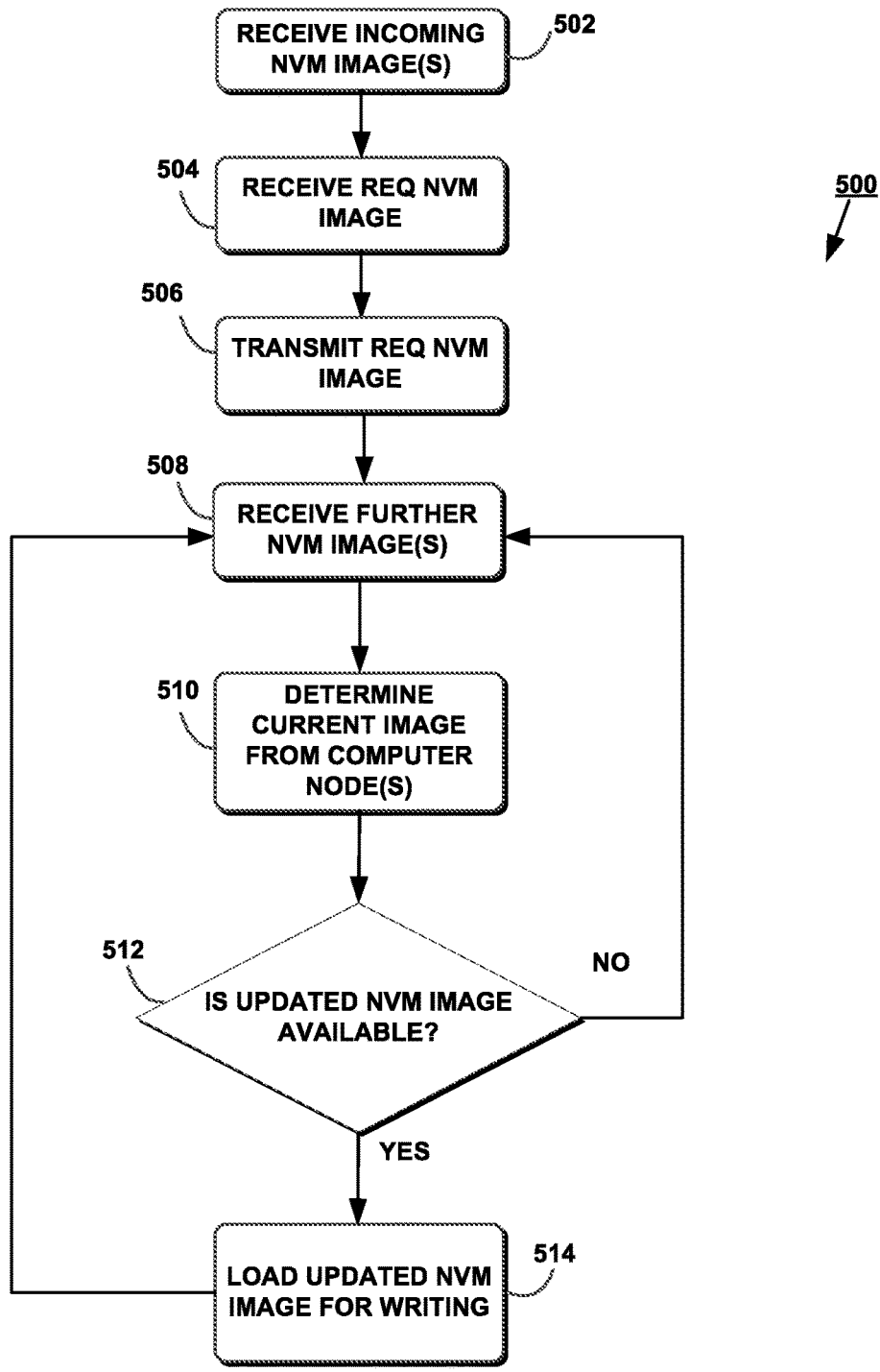
FIG. 5 is a simplified flow diagram of at least one embodiment of a method for updating firmware of a NIC of a computer node of the system of FIG. 1, which may be executed by the server node of FIGS. 1 and 3.

Referring now to FIG. 5, in use, the firmware management module 302 of the server node 114 may execute a method 500 for providing access to NVM firmware images. At the start of the illustrative process, the server 114 may receive incoming NVM images in block 502 that may be manually installed or pushed to the server 114 from a network source. In block 504, the firmware management module 302 receives one or more requests from computer node NICs to receive NVM firmware images. Once the requests are authorized, the firmware management module 302 transmits each requested NVM image to one or more respective computer node NICs in block 506. Periodically, or upon request by the firmware management module 302, further (updated) NVM images are received in block 508. In block 510, the firmware management module 302 may determine the current firmware images being used and/or accessed by NICs in the computer nodes (104-110). In block 512, the firmware management module 302 determines if an updated NVM firmware image is available. If an updated NVM firmware image is not available ("NO"), the firmware management module 302 reverts back to block 508 and continues to receive further NVM images. If an updated NVM firmware image is available ("YES"), the firmware management module 302 loads the updated NVM firmware image for writing and access for computer node NICs in block 514 to update each respective firmware. Once updated, the firmware management module 302 continues to receive further NVM images in block 508, and may perform further updates as discussed in connection with blocks 510-514.

In certain embodiments, certain server-side components may be resident in the system to provide efficient NVM firmware image communication and updating. For example, server 114 may be embodied to handle Trivial File Transfer Protocol (TFTP) which allows data transfer to be initiated by the compute node by issuing a request to read or write a particular file, such as a NVM image, on the server node 114. The request can optionally include a set of negotiated transfer parameters proposed by the computer node 104. If the server node 114 grants the request, the file may be sent in fixed length blocks where each block of transferred data may be carried within a single IP packet in order to avoid IP fragmentation, and may be acknowledged by an acknowledgment packet before the next block can be sent. If a packet gets lost in the network, the intended recipient will timeout and may retransmit their last packet (which may be data or an acknowledgment), thus causing the sender of the lost packet to retransmit that lost packet. The sender may keep just one packet on hand for retransmission, since the lock step acknowledgment guarantees that all older packets have been correctly received. It should be noted that under TFTP, both devices involved in a transfer may be considered senders and receivers, as one sends data and receives acknowledgments (e.g., server node 114), the other sends acknowledgments and receives data (e.g., computer node 104).

The TFTP features may also work in conjunction with a Dynamic Host Configuration Protocol (DHCP) where DHCP discovery requests may include a special tag identifying computer nodes as NVMoE clients. If a discovery request includes the tag, the server 114 may reply to the client with configuration data that may include an updated/new NVM image file, which transfers to the client using TFTP. An image file editor may also be provided in the firmware manager module 302 to create and maintain NVM images for all clients.

The various configurations disclosed herein provide numerous advantages in that numerous NICs on computer nodes may be managed and updated substantially simultaneously. Accordingly, NICs for all computer nodes in large-scale computer systems (e.g. data center) can run the same NVM and firmware. In the event of a firmware bug, bug fix rollouts for existing firmware issues may be addressed seamlessly across the network. Furthermore, as the need for a NVM chip residing on a NIC is minimized or eliminated, this potentially eliminates one less point of potential failure on a computer node and/or computer system.

EXAMPLES

Illustrative examples of the technologies disclosed herein are provided below. An embodiment of the technologies may include any one or more, and any combination of, the examples described below.

Example 1 includes a computing device for updating firmware for a network interface controller (NIC) for communicating over a network, comprising a controller module for controlling the communication of data between the NIC and the network; and an access redirection agent module, wherein the access redirection agent module accesses a non-volatile memory (NVM) firmware image over the network via the controller module and wherein the accessed NVM firmware image is utilized by the NIC in the computing device for operation.

Example 2 includes the subject matter of example 1, and wherein the access redirection agent module accesses the NVM firmware image via the controller module using Remote Direct Memory Access (RDMA) over Ethernet.

Example 3 includes the subject matter of any of Examples 1 and 2, and wherein the access redirection agent module accesses the NVM firmware image via the controller module using NVM over Ethernet.

Example 4 includes the subject matter of any of Examples 1-3, and wherein the access redirection agent module comprises a firmware routine that is executed by the access redirection agent module.

Example 5 includes the subject matter of any of Examples 1-4, and wherein the access redirection agent module comprises an applet that executes in a background of a computing device operating system.

Example 6 includes the subject matter of any of Examples 1-5, and wherein the access redirection agent module redirects NVM register access in the computing device to the controller module for communication of data to the network.

Example 7 includes the subject matter of any of Examples 1-6, and wherein the controller module communicates data utilizing a Trivial File Transfer Protocol (TFTP).

Example 8 includes the subject matter of any of Examples 1-7, and wherein the controller module communicates data utilizing a Dynamic Host Configuration (DHCP) protocol in conjunction with the TFTP.

Example 9 includes a network node for reprogramming a network interface controller (NIC) for a computing device on a compute node coupled to a computer network, the network node comprising communications for communicating data with the computer network; a database for storing a plurality of non-volatile memory (NVM) firmware images; and a firmware manager module operatively coupled to the communications and the database, wherein the firmware management module selects one of the plurality of NVM firmware images and provide access to the selected NVM firmware image for the computer node to update computer node firmware for the NIC over the computer network.

Example 10 includes the subject matter of claim 9, and wherein the firmware manager module provides access to the NVM firmware image via the communications using Remote Direct Memory Access (RDMA) over Ethernet.

Example 11 includes the subject matter of any of Examples 9 and 10, and wherein the firmware manager module provides access to the NVM firmware image via the communications using NVM over Ethernet.

Example 12 includes the subject matter of any of Examples 9-11, and wherein the firmware manager module provides access to the NVM firmware image via a firmware routine that is executed by an access redirection agent module the computer node.

Example 13 includes the subject matter of any of Examples 9-12, and wherein the firmware manager module provides access to the NVM firmware image via an applet that executes in a background of a computer node's operating system.

Example 14 includes the subject matter of any of Examples 9-13, and wherein the firmware manager module provides access to the NVM firmware image via a access redirection agent module in the computer node that redirects NVM register access in the computer node to the server node.

Example 15 includes the subject matter of any of Examples 9-14, and wherein the communications communicate data utilizing a Trivial File Transfer Protocol (TFTP).

Example 16 includes the subject matter of any of Examples 9-15, and wherein the communications communicate data utilizing a Dynamic Host Configuration (DHCP) protocol in conjunction with the TFTP.

Example 17 includes a method for updating firmware for a network interface controller (NIC) for a computing device coupled to a network, comprising establishing communications with the network via a controller module; activating an access redirection agent module in the computing device to access a non-volatile memory (NVM) firmware image from the network; and utilizing the accessed NVM firmware image for the NIC of the computing device for operation.

Example 18 includes the subject matter of claim 17, and wherein accessing the NVM firmware image comprises accessing the NVM firmware image using Remote Direct Memory Access (RDMA) over Ethernet.

Example 19 includes the subject matter of any of Examples 17 and 18, and wherein accessing the NVM firmware image comprises accessing the NVM firmware image using NVM over Ethernet.

Example 20 includes the subject matter of any of Examples 17-19, and wherein activating an access redirection agent module comprises activating a firmware routine that is executed by the NIC.

Example 21 includes the subject matter of any of Examples 17-20, and wherein activating an access redirection agent module comprises activating an applet that executes in a background of a computing device operating system.

Example 22 includes the subject matter of any of Examples 17-21, and further comprising redirecting NVM register access in the computing device via the access redirection agent module to the controller for communication to the network.

Example 23 includes the subject matter of any of Examples 17-22, and wherein establishing communications with a network comprises communicating via a Trivial File Transfer Protocol (TFTP).

Example 24 includes the subject matter of any of Examples 17-23, and wherein establishing communications with a network comprises communicating a Dynamic Host Configuration (DHCP) protocol in conjunction with the TFTP.

Example 25 includes a method for reprogramming a network interface controller (NIC) for a computing device on a compute node via a server node coupled to a computer network, comprising receiving a plurality of non-volatile memory (NVM) firmware images via communications in the server node; storing, in a memory, the plurality of NVM firmware images in a server node database; selecting, via a server node firmware manager module, one of the plurality of NVM firmware images; and providing access, via the server node firmware manager module, to the selected NVM firmware image for the computer node to update computer node firmware for the computing device over the computer network.

Example 26 includes the subject matter of Example 25, and wherein providing access to the NVM firmware image comprises communicating via Remote Direct Memory Access (RDMA) over Ethernet.

Example 27 includes the subject matter of any of Examples 25 and 26, and wherein providing access to the access to the NVM firmware image comprises communicating via NVM over Ethernet.

Example 28 includes the subject matter of any of Examples 25-27, and wherein providing access to the NVM firmware image comprises receiving a signal provided from a firmware routine that is executed by the computer node.

Example 29 includes the subject matter of any of Examples 25-28, and wherein providing access to the NVM firmware image comprises receiving a signal provided from an applet that executes in a background of a computer node's operating system.

Example 30 includes the subject matter of any of Examples 25-29, and wherein providing access to the NVM firmware image comprises receiving a signal provided from an access redirection agent module in the computer node that redirects NVM register access in the computer node to the server node.

Example 31 includes the subject matter of any of Examples 25-30, and wherein the communications communicate data utilizing a Trivial File Transfer Protocol (TFTP).

Example 32 includes the subject matter of any of Examples 25-31, and wherein the communications communicate data utilizing a Dynamic Host Configuration (DHCP) protocol in conjunction with the TFTP.

Example 33 includes one or more machine-readable media comprising a plurality of instructions stored thereupon that, in response to execution by a computing device, causes the computing device to perform the method of any of claims 17-32.

Example 34 includes a computing device for updating firmware for a network interface controller (NIC) for communicating over a network. The computing device includes means for establishing communications with the network via a controller module; means for activating an access redirection agent module in the computing device to access a non-volatile memory (NVM) firmware image from the network; and means for utilizing the accessed NVM firmware image for the NIC of the computing device for operation.

Example 35 includes the subject matter of Example 34, and wherein the means for accessing the NVM firmware image comprises means for accessing the NVM firmware image using Remote Direct Memory Access (RDMA) over Ethernet.

Example 36 includes the subject matter of any of Examples 34 or 35, and wherein the means for accessing the NVM firmware image comprises means for accessing the NVM firmware image using NVM over Ethernet.

Example 37 includes the subject matter of any of Examples 34-36, and wherein the means for activating an access redirection agent module comprises means for activating a firmware routine that is executed by the NIC.

Example 38 includes the subject matter of any of Examples 34-37, and wherein the means for activating an access redirection agent module comprises means for activating an applet that executes in a background of a computing device operating system.

Example 39 includes the subject matter of any of Examples 34-38, and further comprising means for redirecting NVM register access in the computing device via the access redirection agent module to the controller for communication to the network.

Example 40 includes the subject matter of any of Examples 34-39, and wherein the means for establishing communications with a network comprises means for communicating via a Trivial File Transfer Protocol (TFTP).

Example 41 includes the subject matter of any of Examples 34-40, and wherein the means for establishing communications with a network comprises means for communicating a Dynamic Host Configuration (DHCP) protocol in conjunction with the TFTP.

Example 42 includes a network node for reprogramming a network interface controller (NIC) for a computing device on a compute node coupled to a computer network. The network node includes means for receiving a plurality of non-volatile memory (NVM) firmware images via communications in the server node; means for storing, in a memory, the plurality of NVM firmware images in a server node database; means for selecting, via a server node firmware manager module, one of the plurality of NVM firmware images; and means for providing access, via the server node firmware manager module, to the selected NVM firmware image for the computer node to update computer node firmware for the computing device over the computer network.

Example 43 includes the subject matter of Example 42, and wherein the means for providing access to the NVM firmware image comprises means for communicating via Remote Direct Memory Access (RDMA) over Ethernet.

Example 44 includes the subject matter of any of Examples 42 or 43, and the means for providing access to the access to the NVM firmware image comprises means for communicating via NVM over Ethernet.

Example 45 includes the subject matter of any of Examples 42-44, and wherein the means for providing access to the NVM firmware image comprises means for receiving a signal provided from a firmware routine that is executed by the computer node.

Example 46 includes the subject matter of any of Examples 42-45, and wherein the means for providing access to the NVM firmware image comprises means for receiving a signal provided from an applet that executes in a background of a computer node's operating system.

Example 47 includes the subject matter of any of Examples 42-46, and wherein the means for providing access to the NVM firmware image comprises means for receiving a signal provided from an access redirection agent module in the computer node that redirects NVM register access in the computer node to the server node.

Example 48 includes the subject matter of any of Examples 42-47, and wherein the communications communicate data utilizing a Trivial File Transfer Protocol (TFTP).

Example 49 includes the subject matter of any of Examples 42-48, and wherein the communications communicate data utilizing a Dynamic Host Configuration (DHCP) protocol in conjunction with the TFTP.

The invention claimed is:

1. A computing device to update firmware for a network interface controller (NIC) for communication over a network, comprising:
    a controller module to control the communication of data between the NIC and the network; and
    an access redirection agent module to access a NIC firmware image stored in a non-volatile memory (NVM) over the network via the controller module, wherein the access redirection agent module comprises an applet that executes in a background of an operating system of the computing device and is configured to redirect NVM accesses of the NIC to a remote NVM server over the network to provide access to the NIC firmware image, wherein the controller module is further to boot the NIC using the accessed NIC firmware image.

2. The computing device of claim 1, wherein the access redirection agent module accesses the NIC firmware image via the controller module using Remote Direct Memory Access (RDMA) over Ethernet.

3. The computing device of claim 1, wherein the access redirection agent module accesses the NIC firmware image via the controller module using NVM over Ethernet.

4. The computing device of claim 1, wherein the access redirection agent module comprises a firmware routine that is executed by the access redirection agent module.

5. One or more non-transitory computer-readable storage media for a network interface controller (NIC) for a computing device coupled to a network, the computer-readable storage media comprising a plurality of instructions stored thereon that in response to being executed cause a computing device to:
   establish communications with the network via a controller module;
   activate an access redirection agent module in the computing device to access a NIC firmware image stored in a non-volatile memory (NVM) from the network, wherein the access redirection agent module comprises an applet that executes in a background of an operating system of the computing device and wherein activating the access redirection agent module comprises to redirect NVM accesses of the NIC to a remote NVM server over the network to provide access to the NIC firmware image; and
   boot the NIC utilizing the accessed NIC firmware image.

6. The one or more non-transitory computer-readable storage media of claim 5, wherein to access the NIC firmware image comprises to access the NIC firmware image using Remote Direct Memory Access (RDMA) over Ethernet.

7. The one or more non-transitory computer-readable storage media of claim 5, wherein to access the NIC firmware image comprises to access the NIC firmware image using NVM over Ethernet.

8. The one or more non-transitory computer-readable storage media of claim 5, wherein to activate an access redirection agent module comprises to activate a firmware routine that is executed by the NIC.

9. A method for updating firmware of a network interface controller (NIC) over a network, the method comprising:
   establishing communications with the network via a controller module;
   activating an access redirection agent module in the computing device to access a NIC firmware image stored in a non-volatile memory (NVM) from the network, wherein the access redirection agent module comprises an applet that executes in a background of an operating system of the computing device and wherein activating the access redirection agent module comprises to redirect NVM accesses of the NIC to a remote NVM server over the network to provide access to the NIC firmware image; and
   booting the NIC utilizing the accessed NIC firmware image.

10. The method of claim 9, wherein accessing the NIC firmware image comprises accessing the NIC firmware image using Remote Direct Memory Access (RDMA) over Ethernet.

11. The method of claim 9, wherein accessing the NIC firmware image comprises accessing the NIC firmware image using NVM over Ethernet.

12. The method of claim 9, wherein activating an access redirection agent module comprises activating a firmware routine that is executed by the NIC.

* * * * *